United States Patent
Lam et al.

(10) Patent No.: US 9,657,798 B2
(45) Date of Patent: May 23, 2017

(54) FRICTION MATERIAL INCLUDING A PLURALITY OF BINDER PARTICLES WITH FRICTION MODIFYING PARTICLES BOUND THERETO

(75) Inventors: Robert C. Lam, Rochester, MI (US); Feng Dong, Rochester, MI (US)

(73) Assignee: BORGWARNER INC., Auburn Hills, MI (US)

( * ) Notice: Subject to any disclaimer, the term of this patent is extended or adjusted under 35 U.S.C. 154(b) by 27 days.

(21) Appl. No.: 13/143,423

(22) PCT Filed: Jan. 9, 2009

(86) PCT No.: PCT/US2009/030636
§ 371 (c)(1),
(2), (4) Date: Sep. 14, 2011

(87) PCT Pub. No.: WO2010/080154
PCT Pub. Date: Jul. 15, 2010

(65) Prior Publication Data
US 2012/0108698 A1 May 3, 2012

(51) Int. Cl.
*F16D 69/02* (2006.01)
(52) U.S. Cl.
CPC .... *F16D 69/026* (2013.01); *F16D 2200/0069* (2013.01)
(58) Field of Classification Search
CPC ................. F16D 69/026; F16D 2200/0069
USPC ........................................ 508/100; 523/156
See application file for complete search history.

(56) References Cited

U.S. PATENT DOCUMENTS

| | | | |
|---|---|---|---|
| 3,007,890 A | 11/1961 | Twiss et al. | |
| 4,178,278 A | 12/1979 | Reynolds, Jr. | |
| 4,269,754 A | * 5/1981 | Lang et al. | ................... 523/158 |
| 4,451,590 A | 5/1984 | Fujimaki et al. | |
| 5,083,650 A | 1/1992 | Seiz et al. | |
| 5,325,941 A | * 7/1994 | Farinacci et al. | ...... 188/218 XL |
| 5,707,905 A | 1/1998 | Lam et al. | |
| 5,753,356 A | 5/1998 | Lam et al. | |
| 5,856,224 A | 1/1999 | Sheu | |
| 5,858,883 A | 1/1999 | Lam et al. | |
| 5,958,507 A | 9/1999 | Lam et al. | |
| 5,998,307 A | 12/1999 | Lam et al. | |
| 6,001,750 A | 12/1999 | Lam | |

(Continued)

FOREIGN PATENT DOCUMENTS

| | | |
|---|---|---|
| CN | 1733825 A | 2/2006 |
| EP | 0892896 A1 | 1/1999 |

(Continued)

OTHER PUBLICATIONS

Kipp, Dale O. (2004; 2010). Plastic Material Data Sheets.. MatWeb—Division of Automation Creation, Inc.. Online version available at: http://www.knovel.com/web/portal/browse/display?_EXT_KNOVEL_DISPLAY_bookid=1023&VerticalID=0.*

(Continued)

*Primary Examiner* — Nicole M Buie-Hatcher
(74) *Attorney, Agent, or Firm* — Howard & Howard Attorneys PLLC

(57) ABSTRACT

One exemplary embodiment includes a friction material including a base including a plurality of fibers. The base including an engagement surface, and a plurality of binder particles and friction modifying particles at the engagement surface.

30 Claims, 3 Drawing Sheets

(56) References Cited

U.S. PATENT DOCUMENTS

| | | | |
|---|---|---|---|
| 6,130,176 A | 10/2000 | Lam | |
| 6,524,681 B1* | 2/2003 | Seitz et al. | 428/143 |
| 6,630,416 B1 | 10/2003 | Lam et al. | |
| 6,979,713 B2* | 12/2005 | Barber, Jr. | 525/124 |
| 2003/0162007 A1* | 8/2003 | Klett et al. | 428/304.4 |
| 2006/0019080 A1* | 1/2006 | Lam et al. | 428/292.1 |
| 2007/0117881 A1* | 5/2007 | Watanabe et al. | 523/153 |
| 2012/0108698 A1 | 5/2012 | Lam et al. | |

FOREIGN PATENT DOCUMENTS

| | | |
|---|---|---|
| EP | 1521001 A2 | 4/2005 |
| EP | 1203897 A1 | 5/2008 |
| JP | 2000509467 A | 7/2000 |
| JP | 2001279230 A | 10/2001 |

OTHER PUBLICATIONS

3M Zeeospheres Product Information Sheet.*
Chinese Office Action dated Jan. 14. 2013; Application No. 200980152310.2; Applicant: BorgWarner Inc.; 12 pages.
Japanese Office Action dated Jul. 29, 2013; Application No. 2011-545336; Applicant: BorgWarner Inc.; 5 pages.
Supplementary European Search Report dated Oct. 21, 2013; Applicant: BorgWarner Inc.; Application No. 09837739.3-1355; 8 pages.
Japanese Office Action dated Apr. 1, 2014; Application No. 2011-545336; Applicant: Borg Warner Inc. ; 7 pages.
Korean Office Action dated Aug. 29, 2014 ; Application No. 10-2011-7017510 ; Applicant: BorgWarner Inc.; 6 pages.
Japanese Office Action dated Jan. 20, 2015 ; Application No. 2011-545336 ; Applicant : BorgWarner Inc.; 5 pages.

* cited by examiner

FRICTION MATERIAL INCLUDING A PLURALITY OF BINDER PARTICLES WITH FRICTION MODIFYING PARTICLES BOUND THERETO

TECHNICAL FIELD

The field to which the disclosure generally relates to includes friction materials for a variety of applications including, but not limited to slip clutches, start clutches torque transfer clutches, torque converters and the like.

BACKGROUND

Those skilled in the art are continually seeking alternatives and improvements to friction materials for use in a variety of applications including, but not limited to, slipping clutches, torque transfer clutches, and torque converters.

SUMMARY OF EXEMPLARY EMBODIMENTS OF THE INVENTION

A product comprising a friction material comprising a base material comprising a plurality of fibers, the base material having an engagement surface, and a plurality of discretely placed binder particles at the engagement surface, and a plurality of smaller friction modifying particles bound to at least one of the binder particles.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1:
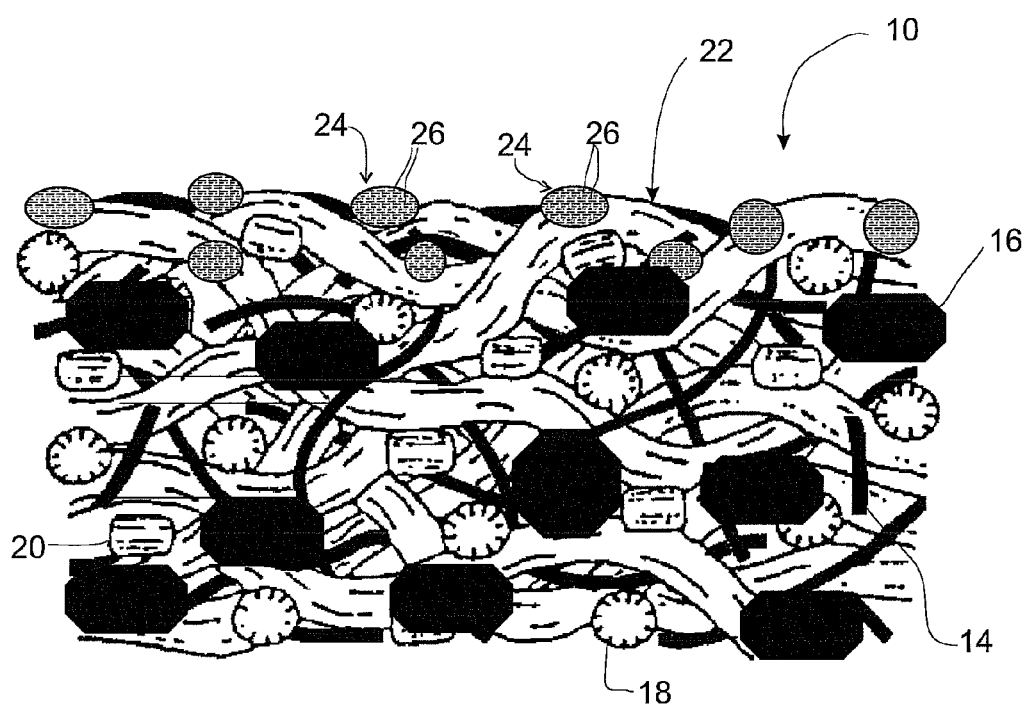
FIG. 1 illustrates a friction material including a base including fibers, the friction material having an engagement surface and a plurality of uncured binder particles and a plurality of smaller friction modifying particles at the engagement surface according to one exemplary embodiment of the invention.

Referring now to FIG. 1, one embodiment of the invention includes a friction material 10 which may include a plurality of fibers 12 and 14 which may be of different types as described hereafter. A plurality of particles 16 and 18 may also be included in the friction material. Some of the particles 16 may be relatively large, to provide a desired friction characteristic and pore size. A variety of smaller particles 18 and 20 may be provided for improving friction characteristics; heat resistance and strength. The friction material 10 includes an engagement surface 22 for engaging another friction material or substrate. At or near the engagement surface 22 a plurality of binder particles 24 are provided in spaced apart discrete locations. A plurality of smaller friction modifying particles 26 may be bound to the binder particles 24. The binder particles 24 may be, in the embodiment shown in FIG. 1, a polymer or resin that may not be cured. In embodiment, the binder particles 24 may include a flowable uncured resin or polymer. The binder particles 24 may include, for example, silicone, phenolic, polyamide or polyimide resins. The smaller friction modifying particles 26 may be inorganic or organic particles. For example, the smaller friction modifying particles 26 may include carbon, metal, oxides of metals, silica, or cashew oil modified particles.

Figure 2:
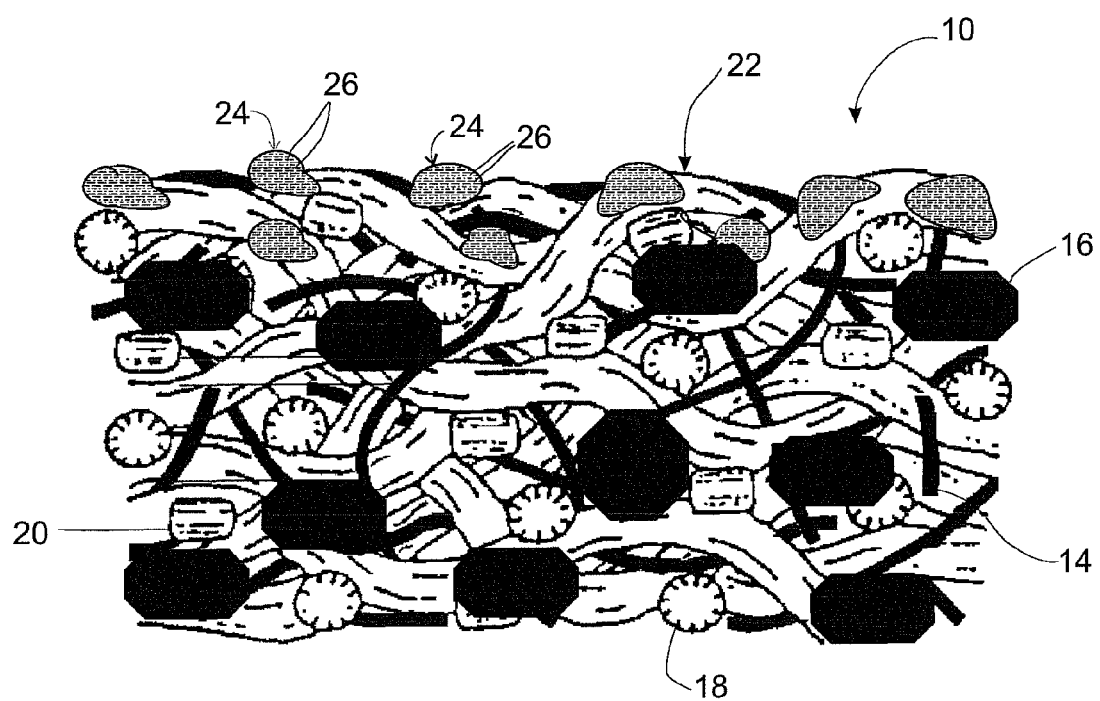
FIG. 2 illustrates a friction material including a plurality of fibers, the friction material having an engagement surface, and a plurality of irregular shaped binder particles discretely placed with a plurality of smaller friction modifying particles bound to the irregular shaped binder particle according to one exemplary embodiment of the invention.
Figure 3:
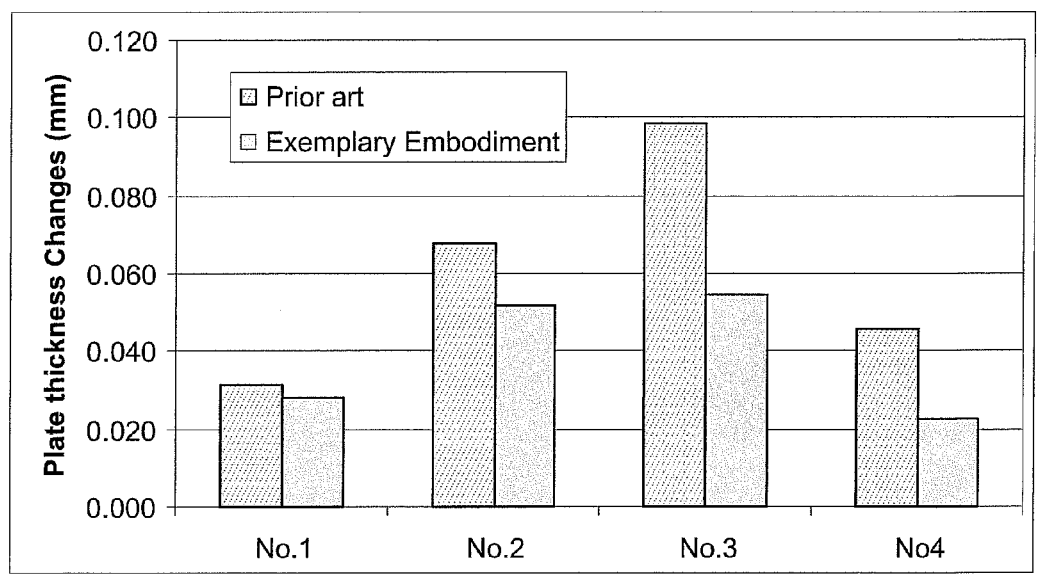
FIG. 3 is a bar chart of the result of a comparative wear resistance test of a friction material including a plurality of shaped binder particles discretely placed with a plurality of smaller friction modifying particles bound to the irregular shaped binder particle according to one exemplary embodiment of the invention and a friction material without such binder particles.

In one embodiment, the friction material shown in FIG. 1, includes a regular shaped binder particle 24. For example, the flowable uncured binder particle 24 may have a generally spherical shape. Further processing of the friction material 10 may result in the binder particle 24 flowing to an irregular shape as shown in FIG. 2 wherein additional smaller friction modifying particles 26 become adhered to the binder particle 24. For example, the friction material 10 may be heat treated to cause the spherical shaped binder particles 24 to flow picking up additional friction modifying particles 26 and binding the same. The processing may further be conducted so that the binder particles may become irregular shaped, cured binder particles 24' (e.g. become solid thermoset particles) providing for high temperature performance characteristics wherein the smaller friction modifying particles stay bound to the binder particles. For example, a friction including irregular shaped cured binder particles 24' having a plurality of friction modifying particles 26 bound thereto may provide high performance characteristics at high interface temperatures of 350 degrees C. or higher.

A friction material according to one exemplary embodiment was prepared including a plurality of discrete, spaced apart, binder particles having a plurality of smaller friction modifying particles bound thereto at the engagement surface. A friction material was similarly constructed but without the binder particles with smaller friction modifying particles bound thereto. A comparative wear resistance test was conducted on the two materials. Clutch packs including plates 1, 2, 3, 4 were used with the friction material on each plate. The clutch packs were operated for 13,500 cycles of high energy Slip operations and the change in thickness of each friction material on the friction plates 1, 2, 3 and 4 were measured after the test. The change in thickness for the friction material without the binder particles including a smaller friction modifying particle bound thereto is shown by the bars with cross hatching. The change in thickness for the friction material with the binder particles including smaller friction modifying particles bound thereto are shown by the bars without cross hatching 30, 32, 34 and 36. According to one exemplary embodiment, the friction material including the discretely placed binder particles including the plurality of smaller friction modifying particles had improved wear resistance.

Friction materials including either flowable uncured binder particles or cured binder particles including a plurality of smaller friction modifying particles bound thereto may be made by any of a variety of means contemplatable by those skilled in the art. For example, flowable uncured binder particles may be mixed with smaller friction modifying particles in a head box and sprinkled onto the upper surface of a base friction material including a plurality of fibers as such material travels along a conveyor belt passing underneath the head box. The resulting friction material from the conveyor belt may be further impregnated with a liquid resin as will be described hereafter. Thereafter, the flowable uncured binder particles may be cause to soften and flow into an irregular shape and more of the smaller friction modifying particles may be bound to the softened binder material. The flowable uncured binder particles may be caused to flow or soften through the application of heat in a variety of methods including but not limited to oven baking, exposure to radiation, microwave energy, ion bombardment, compression heating, laser heating and the like. Alternatively, cured resin particles having a plurality of smaller friction modifying particles bound thereto may be prepared and provided in a charge box and sprinkled onto the wet friction material flowing along the conveyor belt. Subsequent heat treating of the friction material may or may not be conducted.

An open pore structure of the friction material wherein the binder particles including a plurality of friction modifying particles are provided in discrete, spaced apart, positions at the surface of the friction material may be accomplished using a variety of choices and particle sizes, ratio of particle sizes or the amount of saturation resin used. Such an open pore structure provides for improved flow of oil through the friction material. For example, a friction material produced according to an illustrative embodiment of the present invention was subjected to an oil drop test wherein a four micrometer drop of oil was placed on the surface of the friction material and allowed to flow into the friction material. The time for the oil drop to flow through the material according to the present invention took approximately four seconds compared to a conventional friction material which took approximately ten seconds. Thus, a friction material including discrete, spaced apart, binder particles having a plurality of friction modifying particles bound thereto results in improved oil flow and the friction material. In exemplary embodiments of the invention, the amount of surface area covered by the binder particles including a plurality of smaller friction modifying particles bound thereto may range from about 3 to about 30 percent of the engagement surface area. In one embodiment, the regular shaped particle is spherical shape having an average particle diameter ranging from 1.8-40 microns, from 15-30 microns, or 18-22 microns. The smaller friction modifying particles may have an average diameter ranging from 1-25 microns, or 2-10 microns. The weight ratio of the smaller friction modifying particle to the binder particle may range from 50/50 to 90/10. In one embodiment, approximately nine pounds of friction modifying particle and approximately nine pounds of binder particle are used per 3,000 square foot of the engagement surface area.

A friction material including a plurality of discretely placed cured binder particles having a plurality of friction modifying particles bound thereto was found to have better shudder resistance, reduced thickness loss due to wear, improved durability under high energy launches, and capable of maintaining high performance throughout the life of the material despite being exposed to high interfaced temperatures of 350 degrees C. or higher.

The following description includes exemplary embodiments of various components that may be utilized in the friction material.

Exemplary embodiments of the friction material may have improved anti-shudder characteristics. Also, the friction material may have improved elasticity and porosity which allows for more uniform heat dissipation during use of the friction material. The fluid in the transmission or brake can rapidly move through the porous structure of the friction material. Further, the increased elasticity provides more uniform pressure or even pressure distribution on the friction material such that uneven lining wear or separator plate "hot spots" are eliminated.

The more porous the structure of the friction material, the more efficient is the heat dissipation. The oil flow in and out of the friction material during engagement of the friction material during use occurs more rapidly when the friction material is porous.

Various methods for impregnating the friction materials can be used. The fibrous base material is impregnated with the phenolic or phenolic based resin, preferably so that the impregnating resin material comprises about 20 to about 65 parts, by weight, per 100 parts, by weight, of the friction material. After the fibrous base material has been impregnated with the resin, the impregnated fibrous base material is heated to a desired temperature for a predetermined length of time to form the friction material. The heating cures the phenolic resin at a temperature of about 350.degree. F. When other resins are present, such as a silicone resin, the heating cures the silicone resin at a temperature of about 400.degree. F. Thereafter, the impregnated and cured friction material is adhered to the desired substrate by suitable means.

Various resins useful in impregnating the fibrous base material include phenolic resins and phenolic-based resins. It is to be understood that various phenolic-based resins which include in the resin blend other modifying ingredients, such as epoxy, butadiene, silicone, tung oil, benzene, cashew nut oil and the like, are contemplated as being useful with the present invention. In the phenolic-modified resins, the phenolic resin is generally present at about 50% or greater by weight (excluding any solvents present) of the resin blend. However, it has been found that friction materials, in certain embodiments, can be improved when the impregnant resin blend contains about 5 to about 80%, by weight, and for certain purposes, about 15 to about 55%, and in certain embodiments about 15 to about 25%, by weight, of silicone resin based on the weight of the silicone-phenolic mixture (excluding solvents and other processing acids).

Silicone resins may include, for example, thermal curing silicone sealants and silicone rubbers. Various silicone resins are useful with the present invention. One resin, in particular, comprises xylene and acetylacetone (2,4-pentanedione). The silicone resin has a boiling point of about 362.degree. F. (183.degree. C.), vapor pressure at 68.degree. F. mm, Hg: 21, vapor density (air=1) of 4.8, negligible solubility in water, specific gravity of about 1.09, percent volatile, by weight, 5% evaporation rate (ether=1), less than 0.1, flash point about 149.degree. F. (65.degree. C.) using the Pensky-Martens method. It is to be understood that other silicone resins can be utilized with the present invention. Other useful resin blends include, for example, a suitable phenolic resin comprises (% by wt.): about 55 to about 60% phenolic resin; about 20 to about 25% ethyl alcohol; about 10 to about 14% phenol; about 3 to about 4% methyl alcohol; about 0.3 to about 0.8% formaldehyde; and, about 10 to about 20% water. Another suitable phenolic-based resin comprises (% by wt.): about 50 to about 55% phenol/formaldehyde resin; about 0.5% formaldehyde; about 11% phenol; about 30 to about 35% isopropanol; and, about 1 to about 5% water.

It has also been found that another useful resin is an epoxy modified phenolic resin which contains about 5 to about 25 percent, by weight, and preferably about 10 to about 15 percent, by weight, of an epoxy compound with the remainder (excluding solvents and other processing aids) phenolic resin. The epoxy-phenolic resin compound provides, in certain embodiments, higher heat resistance to the friction material than the phenolic resin alone.

In certain embodiments, the target pick up of resin by the fibrous base material may range from about 20 to about 65%, and, in certain embodiments, about 60 to at least 65%, by weight, total silicone-phenolic resin. After the fibrous base material is impregnated with the resin, the fibrous base material is cured for a period of time (in certain embodiments for about ½ hour) at temperatures ranging between 300-400.degree. F. to cure the resin binder and form the friction material. The final thickness of the friction material depends on the initial thickness of the fibrous base material and, in certain embodiments, preferably ranges from about 0.014" to about 0.040".

It further contemplated that other ingredients and processing aids known to be useful in both preparing resin blends and in preparing impregnating fibrous-based materials can be included in the friction materials.

Both the silicone resin and the phenolic resin are present in solvents which are compatible to each other. These resins are mixed together (in preferred embodiments) to form a homogeneous blend and then used to impregnate a fibrous base material. There is not the same effect if a fibrous base material is impregnated with a phenolic resin and then a silicone resin is added thereafter or vice versa. There is also a difference between a mixture of a silicone-phenolic resin solution, and emulsions of silicone resin powder and/or phenolic resin powder. When silicone resins and phenolic resins are in solution they are not cured at all. In contrast, the powder particles of silicone resins and phenolic resins are partially cured. The partial cure of the silicone resins and the phenolic resins inhibits a good impregnation of the fibrous base material.

In certain embodiments, the fibrous base material is impregnated with a blend of a silicone resin in a solvent which is compatible with the phenolic resin and its solvent. In one embodiment, isopropanol has been found to be an especially suitable solvent. It is to be understood, however, that various other suitable solvents, such as ethanol, methylethyl ketone, butanol, isopropanol, toluene and the like, can be utilized. The presence of a silicone resin, when blended with a phenolic resin and used to impregnate a fibrous base material, causes the resulting friction materials to be more elastic than fibrous base materials impregnated only with a phenolic resin. When pressures are applied to the silicone-phenolic resin blended impregnated friction material of the present invention, there is a more even distribution of pressure which, in turn, reduces the likelihood of uneven lining wear. After the silicone resin and phenolic resin are mixed together, the mixture is used to impregnate a fibrous base material.

In certain embodiments, less fibrillated fibers and carbon fibers are used in the fibrous base material to provide a desirable pore structure to the friction material which, in turn, provides increased thermal resistance to the friction material. The fiber geometry not only provides increased thermal resistance, but also provides delamination resistance and squeal or noise resistance. The presence of the carbon fibers and carbon particles aids in increasing the thermal resistance, maintaining a steady coefficient of friction and increasing the squeal resistance. A relatively low amount of cotton fibers in the fibrous base material improves the friction material's clutch "break-in" characteristics.

The use of less fibrillated aramid fibers and carbon fibers in a fibrous base material improves the friction material's ability to withstand high temperatures. Less fibrillated aramid fibers generally have few fibrils attached to a core fiber. The use of the less fibrillated aramid fibers provides a friction material having a more porous structure; i.e., there are more and larger pores than if a typical fibrillated aramid fiber is used. The porous structure is generally defined by the pore size and liquid permeability. In a preferred embodiment, the fibrous base material defines pores ranging in mean average size from about 2.0 to about 25 microns in diameter. In certain embodiments, the mean pore size ranges from about 2.5 to about 8 microns in diameter and the friction material had readily available air voids of at least about 50% and, in certain embodiments, at least about 60% or higher.

When the friction material has a higher mean flow pore diameter and permeability, the friction material is more likely to run cooler or with less heat generated in a transmission due to better automatic transmission fluid flow throughout the porous structure of the friction material. During operation of a transmission system, oil deposits on the surface of the friction material tend to develop over time due to a breakdown of the automatic transmission fluid, especially at high temperatures. The oil deposits on the fibers decrease the pore openings. Therefore, when the friction material initially starts with larger pores, there are more open pores remaining during the useful life of the friction material. In addition, in embodiments at least partially impregnated with a silicone resin, the silicone resin, due its elastic characteristics, allows the fibers in the friction material to have an even more open structure.

It is desired that the aramid fibers have a length ranging from about 0.5 to about 10 mm and a Canadian Standard Freeness (CSF) of greater than about 300. In certain embodiments, it is desired to use less fibrillated aramid fibers which have a CSF of about 450 to about 550 preferably about 530 and greater; and, in other certain embodiments, about 580-650 and above and preferably about 650 and above. In contrast, more fibrillated fibers, such as aramid pulp, have a freeness of about 285-290.

The "Canadian Standard Freeness" (T227 om-85) means that the degree of fibrillation of fibers can be described as the measurement of freeness of the fibers. The CSF test is an empirical procedure which gives an arbitrary measure of the rate at which a suspension of three grams of fibers in one liter of water may be drained. Therefore, the less fibrillated aramid fibers have higher freeness or higher rate of drainage of fluid from the friction material than other aramid fibers or pulp. Friction materials comprising the aramid fibers having a CSF ranging from about 430-650 (and in certain embodiments preferably about 580-640, or preferably about 620-640), provide superior friction performance and have better material properties than friction materials containing conventionally more fibrillated aramid fibers. The longer fiber length, together with the high Canadian freeness, provide a friction material with high strength, high porosity and good wear resistance. The less fibrillated aramid fibers (CSF about 530-about 650) have especially good long-term durability and stable coefficients of friction.

Various fillers May be included in the base material. In particular, silica fillers, such as diatomaceous earth, are useful. However, it is contemplated that other types of fillers are suitable for use and that the choice filler depends on the particular requirements of the friction material.

In certain embodiments, cotton fiber may be added to the fibrous base material to give the fibrous material higher coefficients of friction. In certain embodiments, about 5 to about 20%, and, in certain embodiments, about 10% cotton can also be added to the fibrous base material.

One example of a formulation for the base material may include about 10 to about 50%, by weight, of a less fibrillated aramid fiber; about 10 to about 35%, by weight, of activated carbon particles; about 0 to about 20%, by weight, cotton fibers, about 2 to about 15%, by weight, carbon fibers; and, about 10 to about 35%, by weight, of a filler material. In certain embodiments, one particular formulation has found to be useful comprises about 35 to about 45%, by weight, less fibrillated aramid fibers: about 10 to about 20%, by weight, activated carbon particles; about 5 to about 15% cotton fibers; about 2 to about 10%, by weight, carbon fibers; and, about 25 to about 35%, by weight, filler. The use of additional free friction modifying particles on the primary layer of the fibrous base material provides a three dimensional structure to the fibrous base material.

The uniformity of the additional free friction modifying particles on the surface of fibrous base materials is achieved by using a range and size of the particles that is preferably from about 0.5 to about 80 microns, and preferably about 0.5 to about 20 microns. In these certain embodiments, it has been discovered that if the friction modifying particle size is too large or too small, the optimum three-dimensional structure not achieved and, consequently, the heat dissipation is not as optimum.

In exemplary embodiments, the amount of additional free friction modifying particles on the primary layer ranges from about 0.2 to about 20%, by weight, and in certain embodiments about 2 to about to about 15%, by weight, and in certain other embodiments about 2 to about 5%, by weight, of the friction paper. In yet other embodiments, the area of coverage of friction modifying particles on the surface may be in the range of the about 3 to about 90% of the surface area.

The friction modifying particles may be deposited on base material. Various friction modifying particles are useful on the fibrous base material. Useful friction modifying particles include silica particles; resin powders such as phenolic resins, silicone resins epoxy resins and mixtures thereof; cashew oil modified particles; partial and/or fully carbonized carbon powders and/or particles and mixtures thereof; and mixtures of such friction modifying particles. In particular, silica particles such as diatomaceous earth, Celite®, Celatom®, and/or silicon dioxide are especially useful. The silica particles are inexpensive organic materials which bond strongly to the fibrous materials. The silica particles provide high coefficients of friction to the friction material. The silica particles also provide the friction material with a smooth friction surface and provides a good "shift feel" and friction characteristics to the friction material such that any "shudder" is minimized.

The above description of embodiments of the invention is merely exemplary in nature and, thus, variations thereof are not to be regarded as a departure from the spirit and scope of the invention.

What is claimed is:

1. A friction material comprising a base material comprising a plurality of fibers, the base material having an engagement surface, a plurality of binder particles and a plurality of friction modifying particles at the engagement surface of the base material, the friction modifying particles having a particle size less than the binder particles, and the weight ratio of friction modifying particles to binder particles ranging from 50/50 to 90/10 and wherein a plurality of the friction modifying particles are bound to each binder particle.

2. A friction material as set forth in claim 1 wherein the binder particles comprise flowable uncured particles.

3. A friction material as set forth in claim 1 wherein the binder particles have a generally spherical shape.

4. A friction material as set forth in claim 1 wherein the binder particles are irregular shaped.

5. A friction material as set forth in claim 1 wherein the binder particles are cured and wherein the friction modifying particles are bound to the binder particles.

6. A friction material as set forth in claim 1 wherein the binder particles comprise at least one of a silicone, phenolic, polyamide, or a polyimide polymer.

7. A friction material as set forth in claim 1 wherein the binder particles comprises a polymer.

8. A friction material as set forth in claim 1 wherein the friction modifying particles comprise at least one of carbon particles, oxide particles, or silica or cashew oil modified particles.

9. A friction material as set forth in claim 4 wherein the binder particles have a size ranging from 1.8-40 microns.

10. A friction material as set forth in claim 1 wherein the friction modifying particles have a size ranging from 1-25 microns.

11. A friction material as set forth in claim 1 wherein the binder particles comprise a phenolic resin and wherein the friction modifying particles comprise silica.

12. A friction material as set forth in claim 11 wherein the binder particles are cured.

13. A friction material as set forth in claim 1 wherein the friction modifying particles are bound to the binder particles and wherein the binder particles having the friction modified particles bound thereto cover approximately 2 to 30 percentage of the engagement surface of the base material.

14. A friction material as set forth in claim 1 wherein the plurality of binder resin particles and a plurality of friction modifying particles bound thereto are discretely located at the engagement surface providing porosity at the engagement surface.

15. A friction material comprising a plurality of irregular shaped cured resin binder particles having a plurality of friction modifying particles bound thereto, the friction modifying particles having a size less than the binder particles, wherein the binder particles comprise at least one of a silicone polymer, a phenolic polymer, a polyamide or a polyimide resin, and wherein the friction modifying particles comprise at least one of carbon particles, oxide particles, silica particles or cashew oil modified particles; and wherein a plurality of the friction modifying particles are bound to each irregular shaped cured resin binder particle.

16. A friction material as set forth in claim 15 further comprising a base material comprising a plurality of fibers, the base material having an engagement surface, a wherein the plurality of irregular shaped cured resin particles having a plurality of friction modifying particles bound thereto are discretely located at the engagement surface providing porosity at the engagement surface.

17. A friction material as set forth in claim 1 wherein the friction modifying particles do not include silica.

18. A friction material as set forth in claim 1 wherein the friction modifying particles are cashew oil modified particles.

19. A friction material as set forth in claim 1 wherein the base material defines pores ranging in mean average size from about 2.0 to about 25 microns in diameter.

20. A friction material as set forth in claim 1 wherein the base material defines pores ranging in mean average size from about 2.5 to about 8 microns in diameter and wherein the friction material comprises air voids of at least about 50%.

21. A friction material as set forth in claim 1 wherein the binder particles are not cured.

22. A friction material as set forth in claim 1 wherein the base material comprises a diatomaceous earth filler.

23. A friction material as set forth in claim 1 wherein the binder particles comprise polyamide polymer.

24. A friction material as set forth in claim 1 wherein the friction material has an open pore structure.

25. A friction material as set forth in claim 1 wherein the base material comprises 10 to 50%, by weight of a less fibrillated aramid fiber.

26. A friction material as set forth in claim 15 wherein the base material comprises 10 to 50% by weight of a less fibrillated aramid fiber.

27. A friction material as set forth in claim 26 wherein the less fibrillated aramid fiber has a Canadian Standard Freeness of 530-650.

28. A friction material comprising a base material comprising a plurality of fibers, the base material having an engagement surface, a plurality of binder particles and a plurality of friction modifying particles at the engagement surface of the base material, the friction modifying particles having a particle size less than the binder particles, and the weight ratio of friction modifying particles to binder particles ranging from 50/50 to 90/10 wherein a plurality of the friction modifying particles are bound to each binder particle, wherein the binder particles comprise flowable uncured particles wherein the binder particles are irregular shaped and wherein the binder particles comprise at least one of a silicone, polyamide, or a polyimide polymer and wherein the friction material further comprises a liquid resin that binds the uncured binder particles to the friction modifying particles.

29. A friction material comprising a base material comprising a plurality of fibers, the base material having an engagement surface, a plurality of binder particles and a plurality of friction modifying particles at the engagement surface of the base material, the friction modifying particles having a particle size less than the binder particles, and the weight ratio of friction modifying particles to binder particles ranging from 50/50 to 90/10 and wherein a plurality of the friction modifying particles are bound to each binder particle wherein the binder particles are cured wherein the binder particles are irregular shaped and wherein the binder particles comprise at least one of a silicone, polyamide, or a polyimide polymer.

30. A friction material as set forth in claim 1 wherein the binder particles comprise a plurality of discrete binder particles have a size ranging from 1.8-40 microns.

* * * * *